United States Patent [19]

Duncan et al.

[11] Patent Number: 5,074,044
[45] Date of Patent: Dec. 24, 1991

[54] DUST DISPOSAL ATTACHMENT FOR A ROTARY ELEMENT OF A POWER TOOL

[76] Inventors: C. Warren Duncan, 2725 Fremont La., Costa Mesa, Calif. 92626; William D. Glynn, 521 Babbs Rd., West Suffield, Conn. 06093

[21] Appl. No.: 691,741

[22] Filed: Apr. 26, 1991

[51] Int. Cl.$^5$ .............................................. B26B 25/00
[52] U.S. Cl. ........................................ 30/124; 30/390; 125/13.01
[58] Field of Search ................... 30/124, 133, 388–391; 125/13.01

[56]  References Cited

U.S. PATENT DOCUMENTS

| 3,332,148 | 7/1967 | Aulerich et al. | 30/124 X |
| 3,481,036 | 7/1969 | Slaughter | 30/124 |
| 4,414,743 | 11/1983 | Pioch et al. | 30/124 |
| 4,422,239 | 12/1983 | Mair | 30/124 |
| 4,675,999 | 6/1987 | Ito et al. | 30/124 |

Primary Examiner—Douglas D. Watts
Attorney, Agent, or Firm—Charles H. Thomas

[57] ABSTRACT

An attachment is provided for a saw or other power tool having a rotary shaft and a circular blade mounted on the shaft. A substitute saw blade guard is fastened on the saw housing to define a dust confining channel about the periphery of a portion of the circular rotary saw blade. A shaft extension is fastened to the exposed tip of the shaft and an impeller is fastened to the shaft extension outside of the dust confining channel. A bonnet with an internal dust transfer passageway is secured relative to the dust guard to confine the impeller within an impeller enclosure. Operation of the rotary blade causes the impeller to rotate to create a suction, thereby drawing air and dust from the channel about the periphery of the rotary blade and into the vortex created at the axial center of the impeller. The impeller discharges air laden with dust from a discharge outlet in the impeller bonnet.

15 Claims, 3 Drawing Sheets

DUST DISPOSAL ATTACHMENT FOR A ROTARY ELEMENT OF A POWER TOOL

BACKGROUND OF THE INVENTION

1. Field of the Invention

The present invention relates to a dust control system for a power tool having a rotatable element for sawing or grinding.

2. Description of the Prior Art

In any sawing or grinding operation employing a disk-shaped or circular rotary saw blade or rotatable grinding element a considerable quantity of dust is produced as the rotatable element cuts or grinds through the material being sawed or ground. The volume and nature of dust produced presents a particular problem in sawing stone, concrete or mortar.

At one time the dust generated from sawing concrete with a rotary saw was controlled by directing a flow of water to the saw blade so as to both cool the saw blade and carry away particulates of concrete or mortar dust generated as the saw cut through concrete or mortar. This necessitated a supply of water to the location at which the concrete or mortar was to be cut. In some locations it is extremely difficult to provide a cooling water supply to a rotary saw used for cutting concrete or mortar. For example, mortar is often cut from between bricks on the side of a building in preparation for tuck pointing the bricks where the mortar has begun to crack and loosen. On tall buildings especially it is extremely difficult to provide a cooling water supply to a concrete saw being used to saw out cracked mortar from between bricks.

In recent years the cutting of mortar and concrete has been performed with power saws employing blades containing diamond cutting elements. Such implements are very advantageous since no cooling water supply is required where diamond tip rotary blades are utilized. However, one major disadvantage of the elimination of cooling water is the large amount of very fine dust generated during the sawing operation. The immediate environment of an individual operating the saw is filled with this very fine dust. The operator must therefore wear a mask to attempt to keep the dust out of his nose, mouth and lungs. Such masks are only partially effective, however. Furthermore, the clouds of dust generated reduce the operator's visibility, thereby slowing the pace at which the concrete can be cut.

SUMMARY OF THE INVENTION

The present invention involves an attachment for a saw or grinder having a rotary, circular or disk shaped blade or grinding element used for cutting or grinding material. The attachment is particularly useful for rotary saws used for cutting concrete and mortar. According to the invention, a substitute saw blade guard is employed in place of a conventional blade guard. The substitute blade guard differs from a conventional guard in that it has a dust passage opening therein. The blade guard of the invention is fastened on the saw housing about the diamond blade sawing disk.

A shaft extension is attached to the tip of the existing rotary shaft upon which the saw blade is mounted. A conventional rotary saw blade mounting shaft is normally threaded externally. The shaft extension of the attachment of the invention therefore normally includes an internally threaded socket which is engageable with the tip of the existing shaft. An impeller is fastened onto the shaft extension and an impeller confining structure is used to enclose the impeller. The configuration of the impeller confining structure defines a passageway from the periphery of the substitute saw blade guard to the impeller, typically leading to the vortex created at the axial center of the impeller. The impeller confining structure also defines an impeller exhaust or discharge outlet that carries dust laden air away from the saw operator. A tube or hose may be connected to the discharge outlet.

The impeller creates a suction or vacuum that draws the dust from the cutting region of the blade rotating within the blade guard. The dust laden air is sucked through a dust transfer passageway defined within the impeller confining structure to the impeller. The impeller then blows the dust laden air out of the impeller confining structure through an exhaust or discharge outlet or port. The discharge outlet may, but does not necessarily, lead to a particulate collection bag.

In grinding cracked mortar from between bricks in preparation for tuck pointing of a building, the dust discharge outlet is connected to a discharge conduit, which may typically take the form of a light weight corrugated hose, about eight feet in length. The hose merely hangs downwardly so as to conduct dust away from the operator, who typically works from scaffolding hanging on the side of the building.

The dust control device of the invention has several significant advantages. It conducts dust away from the operator and thereby dispenses with the requirement for a face mask. This greatly reduces the comfort of the operator. Also, it may well reduce health hazards to the operator. In addition, the invention reduces the dust build-up in the immediate vicinity of the operator, thereby improving visibility so that the operator may complete the job in a minimum of time.

An additional advantage of the invention is that it preserves the saw motor by conducting dust away from the vicinity of the motor. In a conventional rotary saw having a conventional blade guard, dust is not carried away from the cutting edge of the saw blade to any great degree. Consequently, dust generated during the sawing operation will often find its way into the motor housing, where it exerts a highly undesirable abrasive effect on the rotor and stator of the motor. Since the present invention creates a positive vacuum or suction that draws air laden with dust away from the saw blade and away from the saw motor, the life of the motor is extended. The dust will adversely affect the impeller which is employed to create the suction. However, the impeller is relatively cheap part, which can be easily be replaced, unlike the saw motor. Ideally, the impeller can be constructed so as to have a useful life approximately equal to that of the saw blade.

In one broad aspect the present invention may be considered to be an improvement to a saw having a housing, a rotary shaft leading from the housing, and a circular saw blade attached to the rotary shaft. The improvement of the invention is comprised of a dust control attachment including a blade guard attached to the housing to define a dust confining channel about the periphery of a portion of the circular saw blade, an impeller coupled to the rotary shaft and residing outside of the dust confining channel, and an impeller confining structure defining an impeller enclosure, an impeller dust discharge outlet from the impeller enclosure, and a dust transfer passageway to the impeller from the dust confining channel.

Preferably, the substitute blade guard of the invention includes a dust barrier plate having a shaft receiving opening therethrough. The dust barrier plate is located on a side of the saw blade opposite the housing. In some embodiments of the invention the impeller is mounted coaxially with the shaft remote from the housing. The dust barrier plate thereby serves as a partition that separates the dust confining chamber from the impeller enclosure.

In embodiments of the invention where the impeller is coaxially aligned with and coupled to the motor shaft that drives the saw blade in rotation, the impeller confining structure is preferably comprised of a bonnet secured to the blade guard. The bonnet may define the dust transfer passageway internally therewithin. The bonnet is preferably formed of a unitary, interiorally concave, molded shell and an interior partition secured within the shell to define the dust transfer passageway between the shell and the partition.

Because the existing shaft of the saw is often only long enough to receive the saw blade, the dust control attachment of the invention includes a shaft extension that is secured to the shaft and extends completely through the dust confining channel and through the shaft receiving opening in the dust barrier plate. The shaft extension extends into the impeller enclosure and the impeller is secured directly on the shaft extension. Without the shaft extension conventional shafts of rotary saws are not normally long enough to extend through the dust confining enclosure. However, according to the present invention the shaft extension is of a sufficient length such that the impeller can be secured directly on the shaft extension.

In other embodiments of the invention the impeller and the shaft upon which the rotary blade is mounted are not coaxially aligned. Rather, the substitute blade guard and the impeller confining structure may be secured at separate locations to the saw housing. In these embodiments a power transmission means connects the shaft extension to the impeller. The power transmission means may be used to improve the mechanical advantage of power transmitted from the shaft to the impeller. A toothed belt, a V-belt, or a chain drive system may be used as the power transmission means.

In another broad aspect the invention may be considered to be a dust control attachment for a saw having a housing and a rotary blade secured for rotation on a shaft. The dust control attachment is comprised of a blade guard secured on one side to the housing and forming a dust confining channel about a portion of the periphery of the saw, and also forming a dust confining cavity within which the saw blade rotates. An impeller is coupled to the shaft and is located outside of the dust confining cavity. An enclosing structure is mounted to the housing to form an impeller cavity and to enclose the impeller within the impeller cavity. The enclosing structure also defines a dust transfer passageway from the dust confining channel to the impeller cavity, as well as a dust discharge outlet from the impeller cavity.

The dust control attachment may be configured so as to be readily adaptable to conventional commercially available rotary saws, such as saws used to cut concrete. Thus, existing concrete saws can be readily retrofitted with the attachment of the invention without any modification to widely used commercially available saws.

The utility of the invention is not limited to concrete saws, however. Indeed, the dust control attachment of the invention can be used with any power tool having a disk shaped rotatable element mounted relative to a housing for rotation on a rotary shaft having an axis and extending from the housing. A guard is secured to the housing and has an edge an opposite sides forming an accurate channel about a portion of the periphery of the rotatable element. A dust passage opening to the channel is defined by the guard. A dust barrier plate is located on the side of the guard remote from the power tool housing. The dust barrier plate defines a shaft opening aligned with the shaft axis. An impeller is axially coupled to the rotary shaft remote from the housing. A bonnet is secured relative to the housing to confine the impeller therewithin and to define a dust passage from the dust passage opening in the guard to the axial center of the impeller. The bonnet also defines a dust discharge outlet tangentially aligned with the periphery of the impeller.

The invention may be described with greater clarity and particularity by reference to the accompanying drawings:

DETAILED DESCRIPTION OF THE EMBODIMENTS

Figure 1:
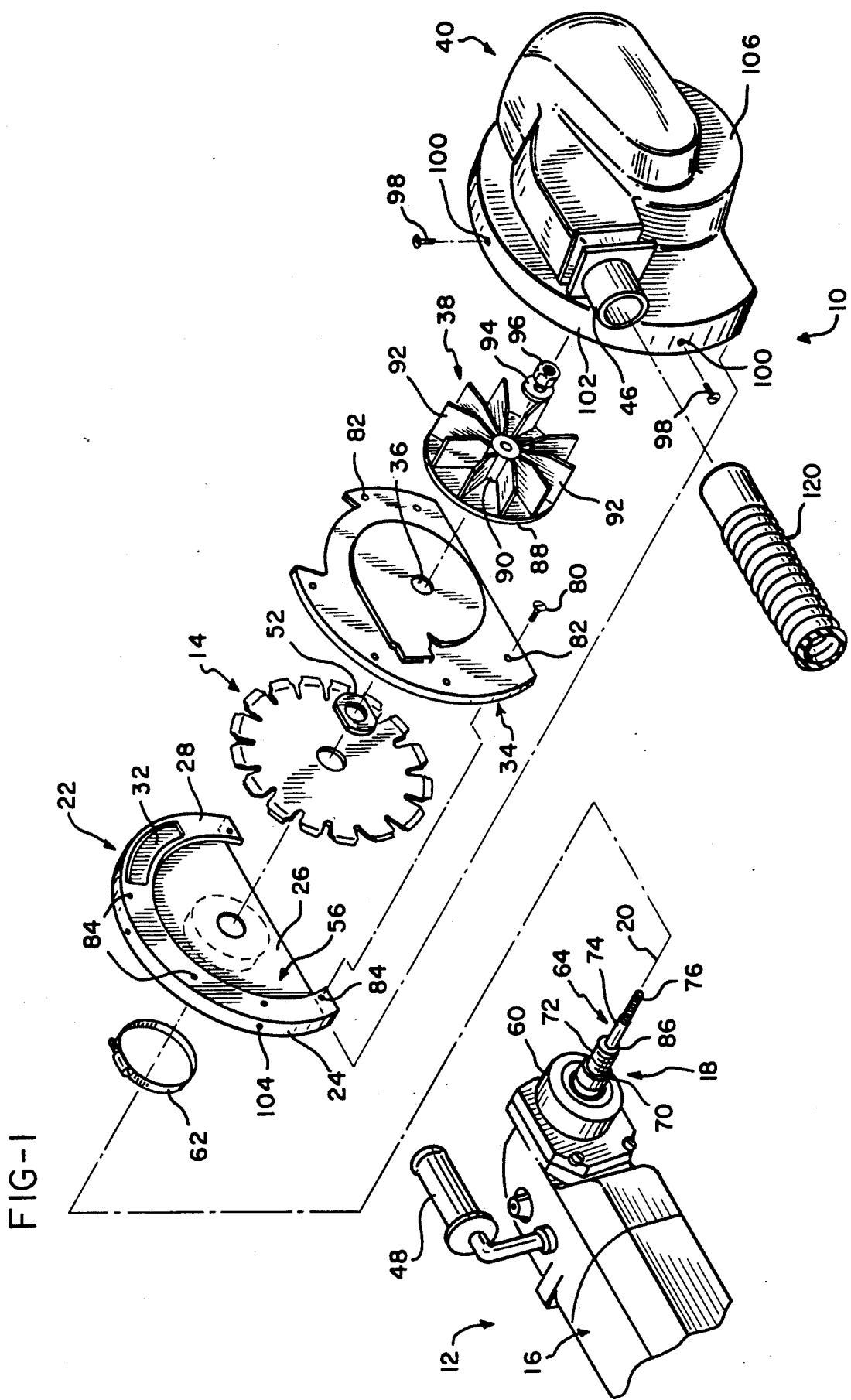
FIG. 1 is an exploded view of a dust control attachment according to the invention and a portion of a power tool upon which it is mounted.

FIG. 1 illustrates an attachment indicated generally at 10 for an electrically powered rotary saw 12 having a circular saw blade 14 mounted relative to a housing 16 for rotation on a rotary shaft 18. The rotary shaft 18 has an axis 20 and extends from the housing 16.

Figure 3:
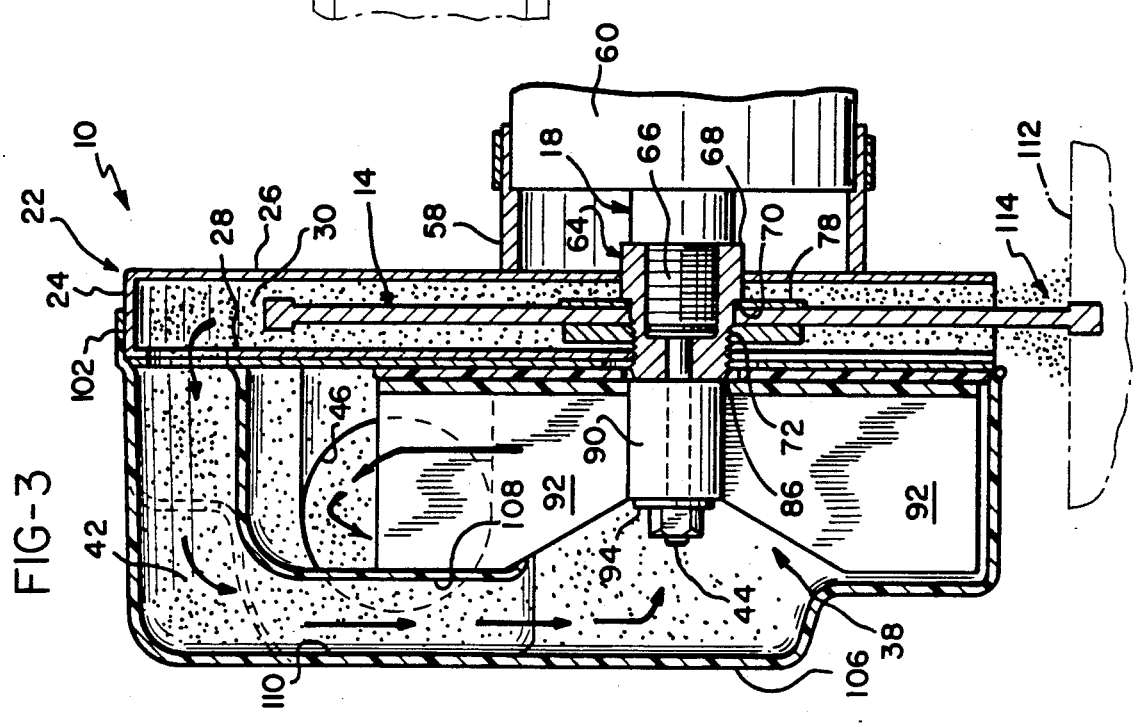
FIG. 3 is a sectional view taken along the lines 3—3 of FIG. 2.

The attachment 10 is comprised of a blade guard 22 secured to the housing 16 and having an edge 24 and opposite sides 26 and 28 forming an arcuate channel 30 about a portion of the periphery of the saw blade 14, as shown in FIG. 3. The blade guard 22 also defines a dust passage opening 32 to the channel 30 in the side 28 of the blade guard 22 that is remote from the housing 16. The opening 32 is in a direction parallel to the shaft axis 20. The blade guard 22 also includes a dust barrier plate 34 on the side 28 of the blade guard 22 remote from the housing 16. The dust barrier plate 34 has a shaft opening 36 aligned with the shaft axis 20. The attachment 10 also includes an impeller 38 that is axially coupled to the rotary shaft 18 remote from the housing 16. A bonnet 40 is secured relative to the blade 14 to define an impeller cavity and to confine the impeller 38 therewithin. The bonnet 40 also defines a dust passage 42 from the dust passage opening 32 in the side of the blade guard 22. The dust passage 42 leads to the axial center 44 of the impeller 38. The bonnet 40 defines a discharge outlet 46 that is tangentially aligned with the periphery of the impeller 38.

The rotary saw 12 may be a conventional, commercially available rotary saw of the type having a cast or cold rolled steel housing 16 and including a guide handle 48. The operator grips the guide handle 48 to control the orientation of the diamond tipped saw blade 14 which is clamped against a shoulder on the rotary shaft 18 by means of a clamping nut 52. The rotary saw 12 typically comes equipped with a blade guard which is removed and replaced with the substitute blade guard 22 constructed and configured according to the invention.

The blade guard 22 is formed of a component 56 which has a generally "J-shaped" cross section, as well as the dust barrier plate 34. The component 56 has a flat side 26 having the shape of a circle with a segment removed and having an axial opening therethrough disposed to face the housing 16 of the rotary saw 12. A tubular annular mounting collar 58 is welded to the flat side 26 of the blade guard component 56 to face the housing 16. The mounting collar 58 is formed with a diameter such that it snugly fits over a corresponding mounting collar 60 on the rotary saw housing 16. A conventional compression band 62 is employed to firmly secure the blade guard 22 to the rotary saw housing 16, as illustrated in FIG. 3.

To allow installation of the dust control attachment 10, a shaft extension 64 is provided. The shaft extension 64 is configured with a socket portion which is internally threaded for threaded engagement with the externally threaded tip 66 of the rotary saw blade shaft 18, as best illustrated in FIG. 3. The shaft extension 64 has a flat annular surface 68 that abuts against a shoulder on the rotary shaft 18 when the socket portion of the shaft extension 64 is engaged with the threaded tip 66 of the rotary shaft 18. The shaft extension 64 also has an annular external bearing shoulder 70 and an intermediate and externally threaded portion 72, as well as an axially projecting stud 74 which terminates in an externally threaded tip 76.

Once the shaft extension 64 has been attached to the rotary shaft 18, the remainder of the dust control attachment 10 may be installed on the rotary saw 12. The component 56 of the blade guard 22 is attached to the saw motor housing 16 by telescopically sliding the tubular mounting collar 58 of the blade guard component 56 onto the external surface of the corresponding mounting collar 60 of the saw housing 16. The compression band 62 is located externally of the mounting sleeve 58 and is tightened radially inwardly to securely immobilize the mounting sleeve 58 of the blade guard 22 against the mounting collar 60 of the housing 16.

A spacing washer 78 is then placed axially onto the shaft extension 64 to abut against the bearing shoulder 70. The saw blade 14 is then placed into position against the spacing washer 78 and is clamped onto the shaft extension 64 by means of the internally threaded clamping nut 52. The clamping nut 52 is advanced onto the intermediate threaded section 72 of the shaft extension 64 to firmly clamp the saw blade 14 into position to bear against the spacing washer 78.

The dust barrier plate 34 is then fastened to the component 56 of the blade guard 22 by means of machine screws 80 that pass longitudinally through peripheral openings 82 in the dust barrier plate 34 to threadably engage in tapped openings 84 in the lip of the component 56 forming the side 28 of the blade guard 22 that is remote from the saw housing 16. The stud 74 of the shaft extension 64 extends through the central opening 36 in the dust barrier plate 34 and has an annular bearing shoulder 86 thereon adapted to receive the base 88 of the impeller 38.

The impeller 38 is comprised of a disk shaped base 88 with an annular hub 90 extending therefrom, and a plurality of vanes 92 extending radially outwardly from the hub 90. A washer 94 and a retaining nut 96 are provided for the threaded extremity 76 of the stud 74. The retaining nut 96 bears against the washer 94 to axially clamp the hub 90 of the impeller 38 against the shoulder 86 of the stud 74. The impeller 38 thereby turns in rotation with the shaft extension 64, which in turn turns with the saw blade shaft 18.

The bonnet 40 is formed as a unitary molded, interiorally concave shell 106 having an annular, peripheral mounting flange 102 extending axially toward the housing 16. The bonnet 40 is also provided with a flat interior partition 108 that is disposed within the shell 106 to define the dust transfer passageway 42 between the interior partition 108 and a portion of the interior surface 110 of the molded shell 106.

The bonnet 40 is then secured relative to the housing 16 by radially directed machine screws 98 which extend through openings 100 in the annular mounting flange 102 of the bonnet 40. The machine screws 98 are threadably engaged in tapped openings 104 in the edge 24 of the blade guard 22.

Figure 2:
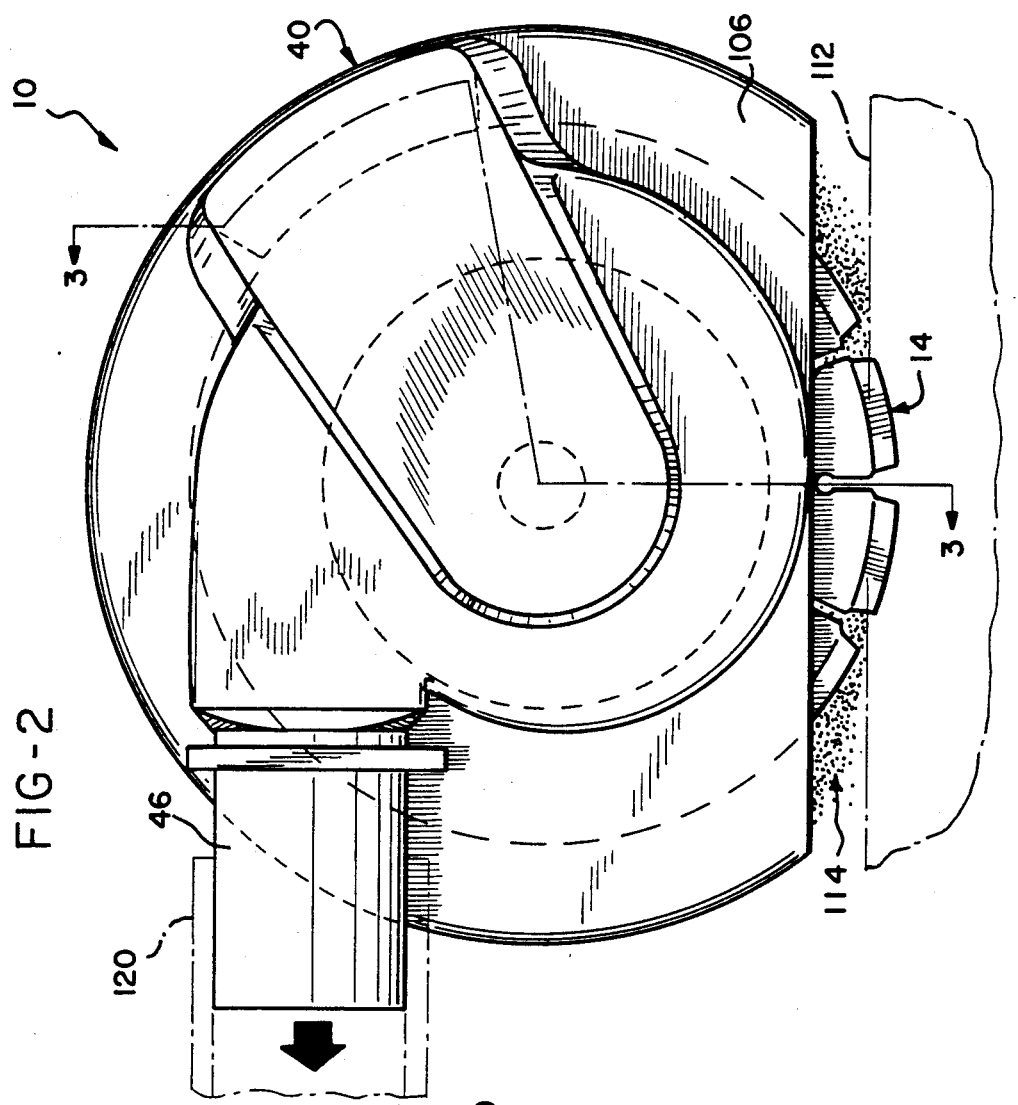
FIG. 2 is a side elevational view of the dust control attachment of FIG. 1 shown as assembled and mounted.

When the rotary saw 12 is operated with the dust control attachment 10 installed as illustrated in FIGS. 2 and 3, the saw motor turns the rotary shaft in 18 in rotation, thereby rotating the shaft extension 64 and the saw blade 14 as well. As the saw blade 14 bites into a substance to be cut, such as a concrete surface 112, fine particles of dust indicated generally at 114 in FIG. 3 are generated.

Since the impeller 38 is locked onto and rotates with the shaft extension 64, it creates a suction as the saw blade 14 turns. This suction exerts a vacuum or suction force emanating from the axial center 44 of the impeller 38 and acting through the dust transfer passageway 42 defined between the interior surface 110 of the shell 106 and the interior partition 104. The suctional force acts through the opening 32 in the blade guard 22 to thereby suck dust laden air from the dust confining cavity 30 formed within the dust guard 22. Due to the suctional force exerted, a major portion of the dust 114 that is generated by sawing is sucked up into the dust confining cavity 30 of the saw blade guard 22 and through the dust transfer passageway 42 toward the vortex created at the axial center 44 of the impeller 38. Upon reaching the impeller 38, the dust laden air is flung radially outwardly by the rotating vanes 90 of the impeller 38. The dust laden air is thus forced out of the bonnet 40 through the dust discharge outlet 46 thereof.

It is typically desirable for a hose 120 to be connected to the exhaust outlet tube 46 to carry the dust laden air some distance away from the operator. The hose 120 may either be connected to a dust collection chamber, or discharged into open air at some distance from the operator of the saw. Typically, the hose 120 should be at least about eight feet in length if it is to be discharged into open air.

By employing the dust control attachment 10 according to the invention, the dust 114 generated by sawing the concrete 112 is not flung indiscriminately away from the saw blade 14 to form a dust cloud about the saw operator and within which the saw operator must breathe. To the contrary, the dust 114 is sucked up into the dust confining cavity 30 and is drawn to the axial center 44 of the impeller 38, and ultimately discharged from the impeller bonnet 40 through the discharge hose 120. The dust control attachment 10 of the invention thereby eliminates the need for a face mask for the operator of the saw. This improves both the comfort level of the operator and also the efficiency of sawing, since the operator's vision is not obscured by clouds of dust 114. Also, as previously noted, the suction of the dust 114 into the bonnet 40 tends to preserve the life of the motor of the rotary saw 12 by removing dust particles 114 from the vicinity of the motor. This eliminates a source of severe abrasive action between the moving motor parts.

Figure 4:
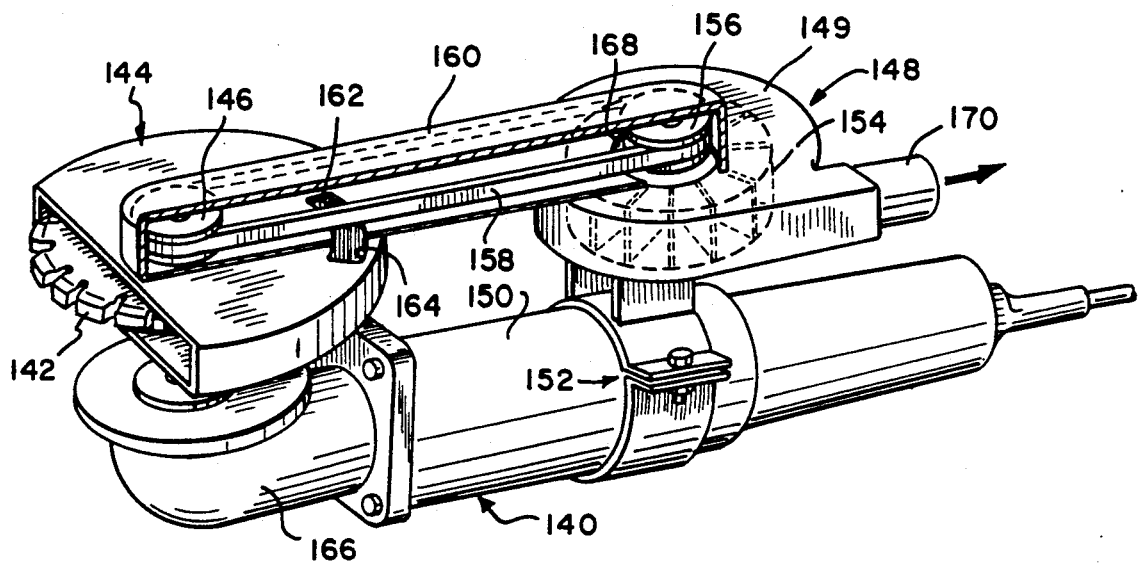
FIG. 4 illustrates one alternative embodiment of the dust control attachment of the invention.

FIG. 4 illustrates an embodiment of the invention designed for use on a smaller rotary saw 140. The rotary saw 140, like the rotary saw 12 is electrically powered and has a rotary disk shaped cutting blade 142. However, the rotary saw 140 is less powerful than the rotary saw 12. As a consequence, it is necessary to provide a mechanical advantage in order to produce sufficient impeller suction to effectuate dust removal.

In the embodiment of FIG. 4 the blade guard 144 is disposed about a portion of the periphery of the rotary saw blade 142. The shaft extension of the rotary saw shaft extends entirely through the blade guard 144. A pulley 146 is coupled to the shaft extension to turn in rotation therewith.

In the embodiment of FIG. 4 the impeller enclosing structure 148 includes an impeller housing 149 that is not mounted coaxially with the blade guard 144, but rather is spaced laterally therefrom and is clamped to the rotary saw housing 150 by a separate clamping system 152, as illustrated. The impeller 154 is mounted for rotation about its own, independent axis parallel to but spaced laterally from the axis of rotation of the saw blade 142. The impeller 154 has its own axle which carries another pulley 156.

The enclosing structure 148 encloses not only the impeller 154, but also the pulleys 146 and 156. The pulleys 146 and 156 are coupled together by an endless toothed belt 158 which is looped about the pulleys 146 and 156 and held in tension. The enclosing structure 148 includes, in addition to the impeller housing 149, a duct 160 that encloses both the pulleys 146 and 156, as well as the drive belt 158 connected therebetween. The duct 160 is shown partially cut away in FIG. 4. An opening 162 is defined in one wall of the duct 160 in registration with the corresponding opening 164 in the side of the blade guard 144 remote from the rotary saw housing 150. At the opposite end of the duct 160 there is a central axial opening 168 in the wall of the duct 160 facing the impeller 154. The opening 168 leads to the center of the impeller 154 located within the impeller housing 149.

When the rotary saw 140 is operated, the saw blade 142 is driven by an electric motor within the saw housing 150 and turns within a channel defined within the blade guard 144. The pulley 146 that is splined, keyed or otherwise locked on the shaft extension turns with the blade 142, thereby driving the belt 158. The belt 158 in turn drives the pulley 156, which in turn rotates the impeller shaft to operate the impeller 154.

As the impeller 154 turns, it creates a suction at its hub thereby creating a flow of dust laden air from the dust confining channel about the blade 142, through the side opening 164 in the outer wall of the blade guard 144 and through the opening 162 into the duct 160. From the duct 160 the dust laden air flows from the opening 162 toward the impeller housing 149 and through the axial opening 168 into the impeller housing 149. The impeller 154 propels the dust laden air through the tangentially located impeller exhaust tube 170 in the same manner as dust laden air is withdrawn from the impeller confining structure 40 of the embodiment of FIGS. 1-3. By employing a pulley and belt system in the embodiment of FIG. 4 a sufficient mechanical advantage is achieved to create a suction by the impeller 154 which is adequate to draw most of the dust generated by the blade 142 through the duct 160 and into the impeller housing 149, to be ejected through the discharge outlet 170.

Figure 5:
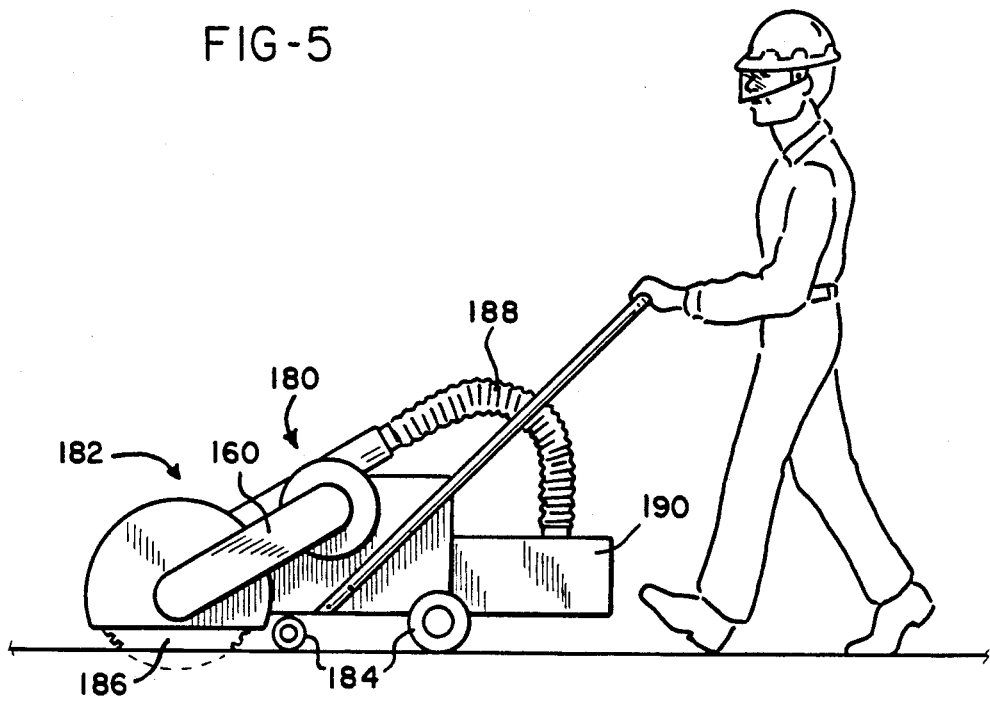
FIG. 5 illustrates another alternative embodiment of the dust control attachment of the invention used on a large, walk-behind concrete saw.

FIG. 5 illustrates yet another embodiment of the invention. FIG. 5 illustrates a dust control attachment 180 having the same configuration as the dust control attachment that is depicted in FIG. 4. The dust control attachment 180 is attached to a walk behind type of concrete saw 182 which rolls on wheels 184. The walk behind concrete saw 182 has a very large blade 186 that is used to saw through concrete slabs and the like. The suction created by the dust control attachment 180 is sufficient to draw the large volume of dust generated into the impeller housing 148. In the embodiment of FIG. 5 a hose 188 is connected to the discharge outlet 170 and to a dust collection box 190. The dust collection box 190 has a very fine filter screen which entraps the dust particles therewithin but allows the air to escape.

It is to be understood that the embodiments of FIGS. 1-5 represent just a few of the possible alternative embodiments of dust control attachments according to the invention. Furthermore, the dust control attachment device of the invention is applicable to rotary saws for sawing other substances, such as wood, tile and other materials in which fine dust particles are generated. The dust control attachment of the invention may likewise be used with sanders and grinders as well. Accordingly, the scope of the invention should not be construed as limited to those specific embodiments illustrated and described in the drawings, but rather is defined in the claims appended hereto.

We claim:

1. In a saw having a housing, a rotary shaft extending from said housing, and a circular saw blade attached to said rotary shaft, the improvement comprising a dust control attachment including a blade guard attached to said housing to define a dust confining channel about the periphery of a portion of said circular saw blade, an impeller coupled to said rotary shaft and residing outside of said dust confining channel, and an impeller confining structure defining an impeller enclosure, an impeller dust discharge outlet from said impeller enclosure, and a dust transfer passageway to said impeller from said dust confining channel.

2. A saw according to claim 1 wherein said blade guard includes a dust barrier plate having a shaft receiving opening therethrough and located on a side of said saw blade opposite said housing, and said impeller is mounted coaxially with said shaft remote from said housing, whereby said dust barrier plate serves as a partition that separates said dust confining channel from said impeller enclosure.

3. A saw according to claim 2 wherein said impeller confining structure is comprised of a bonnet secured to said blade guard and defining said dust transfer passageway interiorally therewithin.

4. A saw according to claim 3 wherein said bonnet is formed of a unitary interiorally concave molded shell and an interior partition secured therewithin to define said dust transfer passageway between said shell and said partition.

5. A saw according to claim 3 further comprising a shaft extension secured to said shaft and extending completely through said dust confining channel, through said shaft receiving opening in said dust barrier plate, and into said impeller enclosure, and said impeller is secured directly on said shaft extension.

6. A saw according to claim 1 further comprising a shaft extension attached to said shaft and extending entirely through said dust confining channel and protruding therebeyond through said blade guard, and power transmission means connecting said shaft extension to said impeller.

7. A saw according to claim 6 further characterized inn that said power transmission means is comprised of a belt drive system.

8. A dust control attachment for a saw having a housing and a rotary blade secured for rotation on a shaft comprising: a blade guard secured on one side to said housing and forming a dust confining channel about a portion of the periphery of said rotary blade and also forming a dust confining cavity within which said blade rotates, an impeller coupled to said shaft and located outside of said dust confining cavity, an enclosing structure mounted to said housing to form an impeller cavity and to enclose said impeller within said impeller cavity and defining a dust transfer passageway from said dust confining channel to said impeller cavity and further defining a dust discharge outlet from said impeller cavity.

9. A dust control attachment according to claim 8 wherein said blade guard has a dust barrier plate with a shaft receiving opening therethrough located on a side of said rotary blade remote from said housing, said impeller is mounted coaxially relative to said shaft, and said enclosing structure is formed as a bonnet attached to said blade guard to define said dust transfer passageway interiorally therewithin.

10. A dust control attachment according to claim 9 further comprising a shaft extension attached to said shaft, and said impeller is mounted directly on said shaft extension.

11. A dust control attachment according to claim 10 wherein said bonnet is formed as a unitary molded, interiorally concave shell and an interior partition disposed within said shell to define said dust transfer passageway between said interior partition and a portion of the interior surface of said molded shell.

12. A dust control attachment according to claim 8 further comprising power transmission means interposed between said shaft and said impeller to drive said impeller remotely from said shaft.

13. A dust control attachment according to claim 12 wherein said power transmission means includes a belt drive system.

14. An attachment for a power tool having a disk-shaped rotatable element mounted relative to a housing for rotation on a rotary shaft having an axis and extending from said housing comprising: a guard secured too said housing and having an edge and opposite sides forming an arcuate channel about a portion of the periphery of said rotatable element and defining a dust passage opening to said channel and including a dust barrier plate on a side of said guard remote from said housing wherein said dust barrier plate defines a shaft opening aligned with said shaft axis, an impeller axially coupled to said rotary shaft remote from said housing, and a bonnet secured relative said housing to confine said impeller therewithin and defining a dust passage from said dust passage opening in said guard to the axial center of said impeller and defining a dust discharge outlet tangentially aligned with the periphery of said impeller.

15. An attachment according to claim 14 further comprising a shaft extension secured to said shaft and upon which said impeller is mounted.

* * * * *